United States Patent [19]

McJones

[11] 4,070,005
[45] Jan. 24, 1978

[54] VALVE HAVING AN IMPROVED SEAT

[76] Inventor: Robert W. McJones, 529 Via Del Monte, Palos Verdes Estates, Calif. 90274

[21] Appl. No.: 650,495

[22] Filed: Jan. 19, 1976

Related U.S. Application Data

[63] Continuation of Ser. No. 498,257, Aug. 19, 1974, abandoned.

[51] Int. Cl.² ............................ F16K 25/04; F16K 1/46
[52] U.S. Cl. ................................ 251/333; 251/DIG. 1; 251/210; 251/324
[58] Field of Search ................ 251/DIG. 1, 333, 332, 251/324, 325, 210

[56] References Cited

U.S. PATENT DOCUMENTS

| | | | |
|---|---|---|---|
| 2,971,090 | 2/1961 | Piet et al. | 251/DIG. 1 |
| 3,358,964 | 12/1967 | Cohen et al. | 251/324 |
| 3,612,479 | 10/1971 | Smith, Jr. | 251/DIG. 1 |

FOREIGN PATENT DOCUMENTS

| | | | |
|---|---|---|---|
| 928,232 | 6/1963 | United Kingdom | 251/324 |

*Primary Examiner*—Arnold Rosenthal
*Attorney, Agent, or Firm*—Elwood S. Kendrick; Patrick F. Bright

[57] ABSTRACT

A linearly displaceable poppet controls the flow of fluid through a valve. The poppet has an external annular channel to communicate an inlet and an outlet port of the valve. Abutting poppet sleeves define a dovetailed groove of restricted volume, the sides of which extrude a Teflon O-ring into the path of a shoulder of the wall defining the channel to close the valve. The extruded section is on the high pressure side of the poppet and is backed by the shoulder and an adjacent poppet sleeve. The seat and seal thus defined are spaced from the channel outlet to the outlet port to avoid erosion from throttling.

9 Claims, 2 Drawing Figures

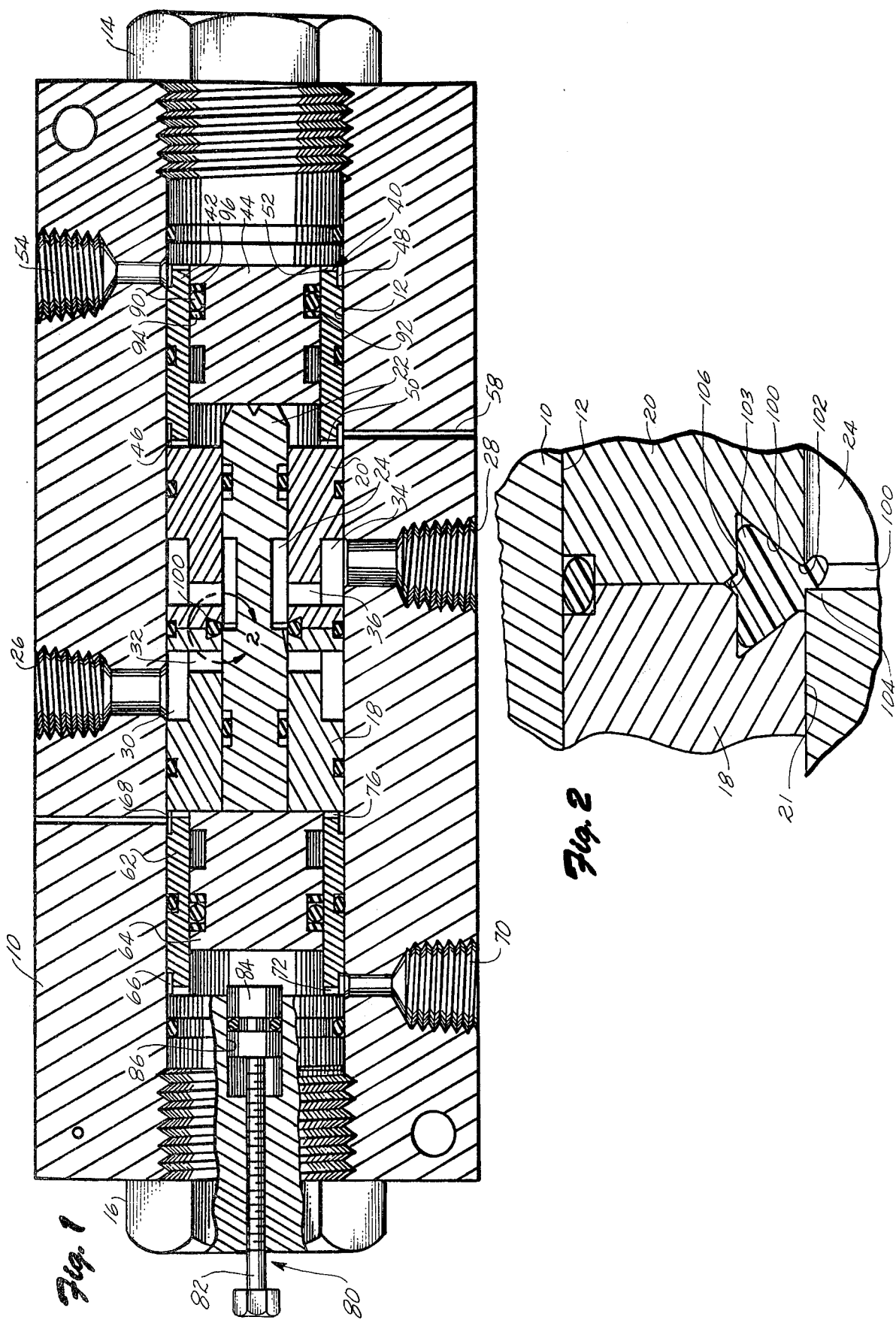

VALVE HAVING AN IMPROVED SEAT

CROSS REFERENCE TO RELATED APPLICATIONS

This is a continuation of application Ser. No. 498,257, filed Aug. 19, 1974, now abandoned.

BACKGROUND OF THE INVENTION

The present invention relates to valves in general and, more in particular, to an improved valve seat and seal of a valve.

Flow control valves in their off position must prevent leakage through the valve. Closure is effected at a seat against which a valving element bears. Typically either the valve element or the seat, or both, has a seal of soft material. The soft material conforms to irregularities in the sealing zone to prevent leakage. For example, a score in a seat of hard material would be closed by a soft seal.

Soft seal materials often are not suitable to handle certain types of fluids. Natural gas, for example, will in time attack, degrade and fail rubber O-rings. A typical failure is manifested by a swelling of the seal. With swelling, the seal can blow out of its seat or become sheared by moving valve parts.

At this time, Teflon is the only known material that will not react with such fluids as natural gas. Teflon is a trademark of E. I. DuPont and Company for a polytetrafluoroethylene.

Teflon presents its own problems and one of them is that it is not elastic. Another problem with Teflon is that it has very poor cold flow characteristics.

When soft seals are employed on a valve and throttling is required it is not uncommon, especially when a pressure drop because of throttling is considerable, to erode soft seal material by rapidly flowing fluid. Obviously such erosion can result in seal failure.

SUMMARY OF THE INVENTION

The present invention provides a valve having an improved seat and seal construction which is especially suitable for seals made of soft materials which are not elastic, such as Teflon.

In general the present invention contemplates the provision of a seal of Teflon-like material extruded into the path of a valving element from a capturing groove to provide a seal through engagement of the valving element with extruded material of the seal. The seal is on the high pressure side of the valve so that high pressure bearing on the extruded portion of the seal resists seal cold flow.

Preferably the seal and valving element engage at a location remote from the opening of the valving element to the outlet of the valve so that any throttling through the valve is not past the seal.

A particular form of the construction of the present invention envisions a valve having a linearly translatable poppet with an external circumferential flow channel. This channel communicates longitudinally spaced-apart inlet and outlet ports of the valve in an open position of the poppet. The poppet is contained and guided by two poppet sleeves of the valve. One of these poppet sleeves has means to communicate the outlet port to the bore of the sleeve. Communication means is present in the second poppet sleeve to communicate the bore of this poppet sleeve with the inlet port. In the open poppet position, the channel spans across the openings into the poppet sleeve bores. The poppet sleeves abut and where they abut define a dovetail groove sized to accommodate an O-ring of Teflon-like material and to extrude this material into the bore of the poppet sleeves for engagement by a shoulder of the poppet in the latter's closed position. This shoulder defines one radial wall of the channel. The Teflon seal and the shoulder of the poppet seal the inlet and outlet of the valve. The communication means through the poppet to the outlet port is spaced from this seal so that throttling through the channel and into the valve outlet does not expose Teflon to erosion. Means are provided to open and to close the poppet.

These and other features, aspects and advantages of the present invention will become more apparent from the following description, appended claims and drawings.

BRIEF DESCRIPTION OF THE FIGURES

FIG. 1 is a view generally in half section of a valve constructed in accordance with the preferred embodiment of the present invention; and FIG. 2 is a view of the seal and valve seat which is characteristic of the present invention.

DESCRIPTION OF THE PREFERRED EMBODIMENT

With initial reference to FIG. 1, the valve in accordance with the preferred application of the seal of the present invention is illustrated. There a valve body 10 has a longitudinal clear-through bore 12 plugged on each end by threaded plugs 14 and 16.

A pair of abutting poppet sleeves 18 and 20 are in bore 12. These sleeves themselves have a bore 21 which receives a linearly translatable poppet 22. Poppet 22 has an annular, external channel 24 which can open at the same time to an outlet port 26 and an inlet port 28, both in body 10. More particularly, an annular external channel 30 of poppet sleeve 18 opens to the bore of the sleeve through radially extending ports 32. In like manner poppet sleeve 20 has an annular external channel 34 which opens into inlet port 28. Channel 34 opens into the bore of sleeve 20 through radially extending ports 36. Channels 30 and 34 open to outlet port 26 and inlet port 28, respectively. Annular external channel 30 of poppet 22 extends a longitudinal distance along the axis of the poppet to communicate ports 32 and 36 and therefore inlet port 26 and outlet port 28. The poppet is translatable between a closed position, which is shown explicitly in FIG. 1, and an open position, which in the Figure is to the left.

An opening piston assembly 40 in bore 12 includes a piston sleeve 42 and a piston 44 translatable within sleeve 42. Piston sleeve 42 is externally channeled at 46 and 48. Ports 50 and 52 extend from the bore of the sleeve to channels 46 and 48, respectively. An opening port 54 in body 10 communicates with channel 48 and through ports 52 with a high pressure side of piston 44. The opposite side of piston 44, which is a low pressure side, is vented to atmosphere by a vent 58 in body 10. Vent 58 opens onto the low side of the piston through channel 46 and ports 50.

A closing piston assembly 60 in bore 12 includes a piston sleeve 62 and a piston 64 translatable in this sleeve. The closing piston assembly sleeve is externally channeled at 66 and 68. A closing port 70 of body 10 opens into channel 66 and through radial ports 72 of sleeve 62, onto a high pressure side of the closing piston.

The opposite and low pressure side of the closing piston is also vented to atmosphere. Venting is through a vent 74 in body 10 which opens into channel 68, which in turn opens onto the low pressure side of closing piston 64 through ports 76 in the sleeve.

Opening piston 44 can act on one end of poppet 22 to force it to the left in FIG. 1. Closing piston 64 can act on the opposite end of the poppet to force it to the right in the Figure.

To prevent the poppet from translating fully to the left in FIG. 1 and exposing a large portion of channel 24 to ports 26 and 28, a throttling mechanism 80 is provided. This mechanism comprises a threaded bolt 82 threaded into plug 16 and a head 84 in a bore 86 of plug 16. The interior end of head 84 can bear on the high pressure side of closing piston 64 to prevent that piston from fully translating to the left. The degree of translation possible, of course, depends on how far head 84 is to the right in the Figure.

Piston sleeves 42 and 62 and poppet sleeves 20 and 18 are compressively engaged by the interior ends of plugs 14 and 16.

As is clear from FIG. 1 the interfaces between the sleeves and bore 12 are sealed with O-ring seals disposed in grooves in the various elements in a standard fashion. Similarly, the interface between plugs 14 and 16 and the wall of bore 24 are sealed by standard O-rings. The high and low pressure sides of both opening and closing pistons 44 and 64 are sealed from one another by O-ring arrangements which are standard except for the use of two backing rings on either side of each O-ring. Double backing rings allow a piston to be inserted in its sleeve in either direction. As is known, backing rings are placed on the low pressure side of an O-ring to prevent excessive O-ring wear. As is typical for both cases, an O-ring 90 in a groove 92 of piston 44 is backed by backing rings 94 and 96. Backing ring 94 is between the O-ring and the low pressure side of the piston. The combination would work just as well if the piston were reversed with backing ring 96 on the low pressure side.

With reference to both FIGS. 1 and 2, the improved seat and seal of the present invention will now be described. As previously described, poppet 22 has a chaneel 24 for communicating inlet port 28 and outlet port 26. As also previously described, poppet sleeves 18 and 20 abut. The abutting poppet sleeves define a generally dovetail annular groove 100. This groove has a mouth 102 opening into bore 21 of the sleeves. The groove is sized to accept a Teflon O-ring 103 and, upon abutting the sleeves, extruding the O-ring into the path of a shoulder 104 of poppet 22.

More particularly, the perimeter of groove 100 is made sufficiently small with respect to the perimeter of the O-ring that the O-ring must extrude through mouth 102 radially into bore 21 to be in the path of shoulder 104. A V-shaped relief 106 of the groove meets the abutting surfaces of the poppet sleeves on their radial inside. The relief provides for seal extrusion radially away from bore 21. This extrusion is incidental to the primary extrusion into the bore. The relief prevents seal material from getting between the abutting surfaces of the poppets. Mouth 102 should be sized to provide a sufficiently thick neck of seal material extruded through it to avoid shearing away of this material by the shoulder of the poppet.

The dovetail groove is necessary, of course, to keep the seal in position and to prevent it from being dislodged by the shoulder in the valve's closed position. The groove is defined by halves symmetrical about a plane containing the abutting poppet sleeve surfaces. Each poppet sleeve has a half of the groove. The dovetail has sides diverging as radius from the axis of the grooves increases. These sides are capped by a third side which parallels the axis.

Shoulder 104 defines one radial wall of channel 24. The shoulder is also a continuation of the general cylindrical surface of the poppet where it interfaces with bore 21.

Groove 100 is axially spaced from ports 32.

Thus shoulder 104 of poppet 22 seats on a Teflon-like O-ring to prevent fluid from flowing between inlet port 28 and outlet port 26.

To throttle, the poppet is translated by pressure applied on the high pressure side of piston 44 to the left in FIG. 1 until piston 24 encounters head 84. Channel 24 will open into ports 32. If the degree of opening is small, throttling will take place. The throttling takes place across hard surfaces, the typically metallic surfaces of the poppet shoulder and poppet sleeve. The soft seal material is away from the throttling zone and experiences only modest fluid velocity. Accordingly, erosion of seal material will not take place.

The seal material faces the high pressure. Therefore when the valve is in its closed position in normal hookup, high pressure will bear on the exposed surfaces of the extruded portions of the seal to resist cold flow of the material and to augment the seal between the material and the shoulder of the poppet. This can be appreciated in FIG. 2, where the high pressure side is to the right of the shoulder and the potential leak path is along the interface between poppet 22 and poppet sleeve 18.

The operation of the valve will now be briefly described. The valve controls fluid flow between inlet port 28 and outlet port 26. The valve is controlled by fluid pressure acting through opening port 54 and closing port 70. When the pressure of fluid acting on the high pressure side of opening piston 44 exceeds the counteracting pressure of fluid acting on the high pressure side of closing piston 64, the valve opens. When the valve is open, channel 24 communicates ports 32 and 36 and the inlet and outlet ports are communicated. When the valve opens, seal 103 no longer engages the poppet and the extruded section of the seal is free and without stress in channel 24. When it is desired to close the valve, the pressure on the closing piston is made to exceed the pressure on the opening piston and the valve will close. With the closing, shoulder 104 engages the extruded section of the seal to effect the seat and seal and the closure of the valve.

The present invention has been described with reference to a certain improved embodiment. The spirit and scope of the appended claims should not, however, necessarily be limited to this description.

What is claimed is:

1. In a valve of the type having a linearly displaceable poppet, an inlet port, an outlet port, a channel on the poppet for communicating the inlet and outlet ports in an open position of the valve, means to open the valve by moving the poppet to a position with the channel opening into the inlet and outlet ports, and means to close the valve by moving the poppet to a position where the channel does not open into the outlet port, an improvement comprising:

a. a pair of abutting poppet sleeves in the valve and receiving the poppet in a bore defined by the sleeves;

b. means compressively loading the poppet sleeves;

c. an annular dovetail groove defined by both poppet sleeves at their abutting intersection and having a mouth opening into the bore;

d. an annular seal in the groove, the seal being of soft and inelastic material, the cross-sectional area of the seal being larger than the cross-sectional area of the groove so that the poppet sleeves extrude the seal through the mouth annularly inward of the bore, the width of the mouth being sufficient to prevent shearing of the seal; and e. means on the poppet to engage the extruded portion of the seal in the valve closed position to prevent communication between the inlet and the outlet ports.

2. The improvement claimed in claim 1 wherein a first of the poppet sleeves has a passage to communicate the bore with the outlet port, and the second of the poppet sleeves has a passage to communicate the bore with the inlet port, the channel of the poppet having a longitudinal length sufficient to communicate the passages in the poppet sleeves, the passages in the poppet sleeves being offset longitudinally along the line of poppet movement, the seal being longitudinally spaced from the passage through the poppet to the outlet port, whereby throttling through the channel into the passage to the outlet port is spaced from the seal.

3. The improvement claimed in claim 1 including an annular relief between the abutting surfaces of the poppet sleeves and the dovetail groove to receive extruded seal material and keep such material from between the abutting surfaces.

4. The improvement claimed in claim 2 including means to throttle flow between the poppet channel and the port passage of the poppet sleeve to the outlet.

5. The improvement claimed in claim 2 wherein the extruded section of the seal is on the high pressure side of the valve.

6. The improvement claimed in claim 5 wherein the means on the poppet to engage the seal includes a shoulder of the poppet which defines a radial wall of the channel of the poppet.

7. The improvement claimed in claim 1 wherein said soft inelastic material is polytetrafluorethylene.

8. In a valve of the type having a linearly displaceable valving element, an inlet port, an outlet port, means associated with the valving element for communicating the inlet and outlet ports in an open position of the valve, means for opening the valving element, and means for closing the valving element, an improvement comprising:

a. a seal of polytetrafluoroethylene;

b. means for extruding the seal into the path of the valving element for engagement thereby in the closed position to seal the fluid path between the inlet and outlet, the extruding means including:

i. means defining a dovetail groove receiving the seal;

ii. the cross-sectional perimeter of the seal being greater than the cross-sectional perimeter of the groove;

iii. means to split toutlet, the extruding means including:

i. means defining a dovetail groove receiving the seal;

ii. the cross-sectional perimeter of the seal being greater than the cross-sectional perimeter of the groove;

iii. means to split the groove for installing the seal; and iv. a relief at the split and opening into the groove to receive seal material.

9. The improvement claimed in claim 8 wherein the communication means associated with the valving element and the outlet port are spaced downstream from the seal to avoid throttling damage to the seal.

* * * * *

UNITED STATES PATENT AND TRADEMARK OFFICE
CERTIFICATE OF CORRECTION

PATENT NO. : 4,070,005
DATED : January 24, 1978
INVENTOR(S) : Robert W. McJones

It is certified that error appears in the above-identified patent and that said Letters Patent are hereby corrected as shown below:

Column 6, line 24, cancel beginning with "iii. means to split toutlet" to and including "perimeter of the groove;" in Column 6, line 30.

Signed and Sealed this

Ninth Day of May 1978

[SEAL]

Attest:

RUTH C. MASON
Attesting Officer

LUTRELLE F. PARKER
Acting Commissioner of Patents and Trademarks